(12) United States Patent
Shi (10) Patent No.: US 12,463,927 B2
(45) Date of Patent: Nov. 4, 2025

(54) SENDING METHOD AND APPARATUS, AND ELECTRONIC DEVICE

(71) Applicant: VIVO MOBILE COMMUNICATION CO., LTD., Guangdong (CN)

(72) Inventor: Congbin Shi, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 238 days.

(21) Appl. No.: 18/333,911

(22) Filed: Jun. 13, 2023

(65) Prior Publication Data

US 2023/0328018 A1    Oct. 12, 2023

Related U.S. Application Data

(63) Continuation of application No. PCT/CN2021/139102, filed on Dec. 17, 2021.

(30) Foreign Application Priority Data

Dec. 24, 2020 (CN) .......................... 202011553760.7

(51) Int. Cl.
*H04L 51/18* (2022.01)
*G06F 3/0482* (2013.01)
*H04L 12/18* (2006.01)
*H04L 51/04* (2022.01)
*H04L 51/21* (2022.01)
*H04L 51/224* (2022.01)

(52) U.S. Cl.
CPC ............ *H04L 51/18* (2013.01); *G06F 3/0482* (2013.01); *H04L 12/185* (2013.01); *H04L 51/04* (2013.01); *H04L 51/21* (2022.05); *H04L 51/224* (2022.05)

(58) Field of Classification Search
None
See application file for complete search history.

(56) References Cited

U.S. PATENT DOCUMENTS

| | | | |
|---|---|---|---|
| 12,063,192 B2* | 8/2024 | Wei | H04L 51/214 |
| 12,301,373 B2* | 5/2025 | Chung | H04L 12/1822 |
| 12,405,698 B2* | 9/2025 | Qu | G06F 3/04847 |

(Continued)

FOREIGN PATENT DOCUMENTS

| | | |
|---|---|---|
| CN | 102932238 A | 2/2013 |
| CN | 103139048 A | 6/2013 |

(Continued)

*Primary Examiner* — Lashonda Jacobs-Burton
(74) *Attorney, Agent, or Firm* — Price Heneveld LLP (57) ABSTRACT

This application discloses a sending method and apparatus, and an electronic device. The method includes: receiving a first input for a communication interface of a target group; displaying M identifiers in response to the first input, where each identifier is used to indicate one group member in the target group, and the M identifiers support to be multiple selected; receiving a second input for N identifiers among the M identifiers; displaying a preset symbol and N names in a preset combination form in an input box in response to the second input, where the N names are names of N group members indicated by the N identifiers; and sending a communication message in the target group, where the communication message includes the preset symbol and the N names in the preset combination form, where both M and N are integers greater than or equal to 2.

10 Claims, 7 Drawing Sheets

(56) References Cited

U.S. PATENT DOCUMENTS

| | | |
|---|---|---|
| 12,405,936 B2* | 9/2025 | Lu ........................ G06F 16/2228 |
| 2012/0124146 A1* | 5/2012 | Hsiao ...................... H04L 51/08 |
| | | 709/206 |
| 2016/0080304 A1 | 3/2016 | Hamlin et al. |
| 2016/0241500 A1* | 8/2016 | Bostick ................... H04L 51/10 |
| 2017/0237785 A1* | 8/2017 | Peng ..................... H04L 65/403 |
| | | 709/206 |
| 2018/0141224 A1* | 5/2018 | Todd ..................... B26B 19/282 |
| 2019/0281003 A1* | 9/2019 | Liu ........................ H04L 65/403 |
| 2020/0021542 A1* | 1/2020 | Zhang ..................... H04L 51/18 |

FOREIGN PATENT DOCUMENTS

| | | |
|---|---|---|
| CN | 105429850 A | 3/2016 |
| CN | 106202095 A | 12/2016 |
| CN | 106454763 A | 2/2017 |
| CN | 109802881 A | 5/2019 |
| CN | 111142747 A | 5/2020 |
| CN | 111444314 A | 7/2020 |
| CN | 106454763 B | 8/2020 |
| CN | 112671635 A | 4/2021 |
| WO | 2018141224 A1 | 8/2018 |
| WO | 2019238123 A1 | 12/2019 |

* cited by examiner

SENDING METHOD AND APPARATUS, AND ELECTRONIC DEVICE

CROSS-REFERENCE TO RELATED APPLICATIONS

This application is a continuation application of PCT Application No. PCT/CN2021/139102 filed on Dec. 17, 2021, which claims priority to Chinese Patent Application No. 202011553760.7, filed on Dec. 24, 2020 in China, disclosures of which are incorporated herein by reference in their entireties.

TECHNICAL FIELD

This application pertains to the field of communications technologies, and in particular, to a sending method and apparatus, and an electronic device.

BACKGROUND

With the development of communication technology, most terminal devices have a group function. When you joined a large number of groups, or group messages are sent frequently, the function of blocking group messages can be enabled to reduce message interference.

Currently, when a group member in a group wants to remind other group members in the group to view the message, the way of @ other group members is usually adopted. For example, the user may first find a profile photo of a group member and touch and hold the profile photo of the group member. In this way, even if the group member has enabled the group message blocking function, the function of reminding the group member to view the message can be realized by ringing, vibrating, displaying prompt information, or the like, so as to prevent the group member who has enabled the group message blocking function from missing an important message.

However, when the user wants to remind a plurality of group members in the group to view the message, the user needs to repeat the foregoing operations such as finding the profile photo of the group member and touch and hold the profile photo, which leads to a cumbersome operation in reminding a plurality of group members to view the message.

SUMMARY

According to a first aspect, an embodiment of this application provides a sending method. The method includes: receiving a first input for a communication interface of a target group; displaying, in response to the first input, M identifiers, where each identifier is used to indicate one group member in the target group, and the M identifiers support to be multiple selected; receiving a second input for N identifiers among the M identifiers; displaying, in response to the second input, a preset symbol and N names in a preset combination form in an input box, where the N names are names of N group members indicated by the N identifiers; and sending a communication message in the target group, where the communication message includes the preset symbol and the N names in the preset combination form, where the preset symbol and the N names in the preset combination form are used to remind the N group members to view the communication message, and both M and N are integers greater than or equal to 2.

According to a second aspect, an embodiment of this application provides a sending method. The method includes: receiving a third input for a first message in a communication interface of a target group; displaying, in response to the third input, in a case that the first message includes a preset symbol and names of S group members in the target group, the preset symbol and the names of the S group members in a preset combination form in an input box; and sending a communication message in the target group, where the communication message includes the preset symbol and the names of the S group members in the preset combination form, where the preset symbol and the names of the S group members in the preset combination form are used to remind the S group members to view the communication message, and S is an integer greater than or equal to 2.

According to a third aspect, an embodiment of this application provides a sending apparatus. The apparatus includes a receiving module, a display module, and a sending module. The receiving module is configured to receive a first input for a communication interface of a target group; the display module is configured to display, in response to the first input received by the receiving module, M identifiers, where each identifier is used to indicate one group member in the target group, and the M identifiers support to be multiple selected; the receiving module is further configured to receive a second input for N identifiers among the M identifiers displayed by the display module; the display module is further configured to display, in response to the second input received by the receiving module, a preset symbol and N names in a preset combination form in an input box, where the N names are names of N group members indicated by the N identifiers; and the sending module is configured to send a communication message in the target group, where the communication message includes the preset symbol and the N names in the preset combination form, where the preset symbol and the N names in the preset combination form are used to remind the N group members to view the communication message, and both M and N are integers greater than or equal to 2.

According to a fourth aspect, an embodiment of this application provides a sending apparatus. The apparatus includes a receiving module, a display module, and a sending module. The receiving module is configured to receive a third input for a first message in a communication interface of a target group; the display module is configured to display, in response to the third input received by the receiving module, in a case that the first message includes a preset symbol and names of S group members in the target group, the preset symbol and the names of the S group members in a preset combination form in an input box; and the sending module is configured to send a communication message in the target group, where the communication message includes the preset symbol and the names of the S group members in the preset combination form, where the preset symbol and the names of the S group members in the preset combination form are used to remind the S group members to view the communication message, and S is an integer greater than or equal to 2.

According to a fifth aspect, an embodiment of this application provides an electronic device, where the electronic device includes a processor, a memory, and a program or an instruction stored in the memory and executable on the processor, and when the program or the instruction is executed by the processor, steps of the sending method according to the first aspect or the second aspect are implemented.

According to a sixth aspect, an embodiment of this application provides a readable storage medium, where the readable storage medium stores a program or an instruction, and when the program or the instruction is executed by a processor, steps of the sending method according to the first aspect or the second aspect are implemented.

According to a seventh aspect, an embodiment of this application provides a chip, where the chip includes a processor and a communications interface, the communications interface is coupled to the processor, and the processor is configured to run a program or an instruction, to implement the sending method according to the first aspect or the second aspect.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

When a group member in a group wants to remind other group members in the group to view the message, the way of @ other group members is usually adopted. In this way, even if other group members enable the group message blocking function of the device, after the devices of other group members receive the message, other group members will be reminded. When the user wants to simultaneously remind a plurality of group members in the group to view the message by using one message, there are usually the following scenarios.

In a first scenario, in the communication interface of the group, the user may first find a profile photo of one group member and touch and hold the profile photo of the group member, so that the symbol of @ and a nickname of the group member will be displayed in the input box in a preset combination form. For other group members in the group, the user needs to repeat the operation of finding a profile photo of one group member and touching and holding the profile photo, and the like.

In a second scenario, the user may input the symbol of @ in the input box of the group, so that the electronic device will switch from the communication interface to a contacts list interface. After the user taps a profile photo of a group member in the contact list interface, the electronic device will return to the communication interface from the contact list interface, and update the symbol of @ in the input box with the symbol of @ and a nickname of the group member in the preset combination form. For each of other group members in the group, the user needs to repeat the operation of inputting the symbol of @, finding a profile photo of one group member and tapping the profile photo, and the like.

In addition, this application further provides a third scenario. In a case that the communication interface of the group includes a communication message of @ a plurality of group members, if the user also wants to remind these group members to view the message, the user may copy the message and paste it in the input box. However, since this message is a common character string in the input box, after sending the message in the input box, if these group members enable the group message blocking function of the device, these group members will not be reminded after the devices of other group members receive the message. In this way, if the user wants to realize a function of @ these group members, the user needs to repeat the operation with reference to the steps in the first solution and the second solution.

It should be noted that in this embodiment of this application, the function corresponding to "a preset symbol and names of a plurality of group members in a preset combination form" is referred to as a function of reminding a plurality of group members or a function of @ a plurality of group members. Through the function of reminding a plurality of group members, even if the plurality of group members have enabled the group message blocking function, the function of reminding the plurality of group members to view the message can be realized by ringing, vibrating, displaying prompt information, or the like, so as to prevent the plurality of group members who have enabled the group message blocking function from missing an important message.

In order to solve the problem of cumbersome operation in the first scenario and the second scenario, the following describes in detail the sending method provided in the embodiments of this application through specific embodiments and application scenarios thereof with reference to FIG. 1 to FIG. 4.

Figure 1:
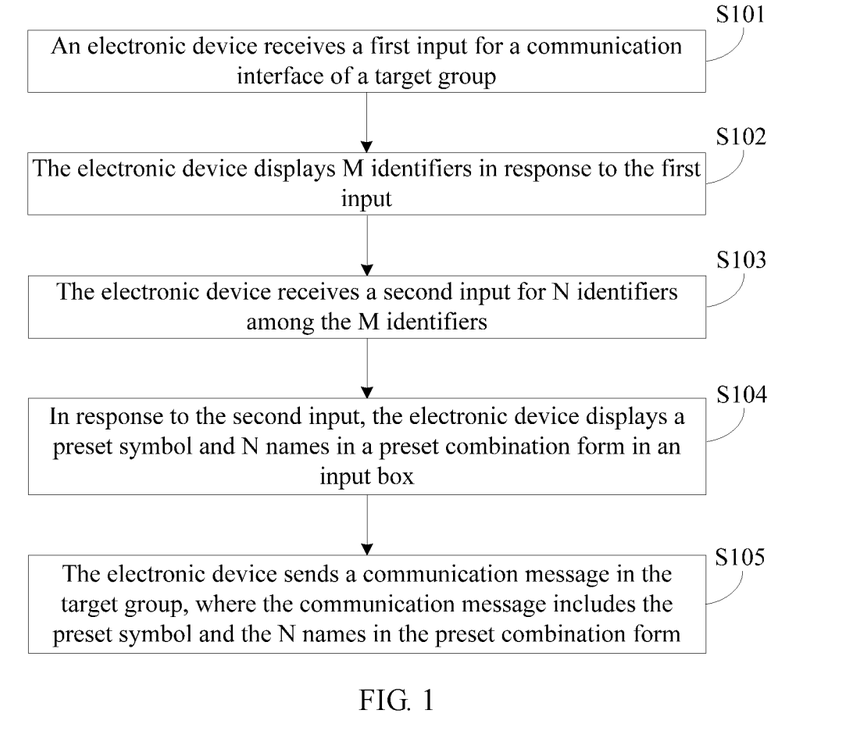
FIG. 1 is a schematic diagram of a sending method according to an embodiment of this application.

As shown in FIG. 1, an embodiment of this application provides a sending method. The method may include the following S101 to S105, and the method is described below by using an example in which an electronic device is an execution entity.

S101. An electronic device receives a first input for a communication interface of a target group.

Optionally, the communication interface may be a chat interface of the target group, that is, a group chat interface.

In this embodiment of this application, the electronic device can be installed with a plurality of communication applications, and the target group can be any one of groups in the plurality of communication applications, and the user using the electronic device is any one of plurality of group members in the target group. When the user wants to @ a plurality of group members in the group, the first input may include at least the following two methods.

One method is that when the electronic device displays the communication interface of the target group, the user may operate an input for a profile photo (such as a first profile photo) of any group member in the communication interface, that is, the first input may be an input for the first profile photo.

The other method is that when the electronic device displays the communication interface of the target group, the user may input a preset symbol in an input box of the communication interface, that is, the first input may be an input for the preset symbol in the input box, such as the symbol of @.

It can be understood that the foregoing two methods are examples of explanations of the first input, which do not limit the embodiments of this application, and the first input can also be any other possible input.

It should be noted that in the embodiments of this application, that the preset symbol is the symbol of @ is used as an example for description, and it can be understood that the preset symbol can also be any other symbol or a plurality of combined symbols. This is not limited in the embodiments of this application.

S102. The electronic device displays M identifiers in response to the first input.

Each of the M identifiers may be used to indicate one group member in the target group, where M is an integer greater than or equal to 2.

Optionally, M group members indicated by the M identifiers are all group members of the target group, or the M group members indicated by the M identifiers are group members other than a target group member in the target group. The target group member is a user who uses the electronic device, or a user preset by a user who uses the electronic device, or a group member in the target group who meets a preset condition, or the like. This is not limited in the embodiments of this application.

It should be noted that in the prior art, identifiers used to indicate group members do not support to be multiple selected, that is, the user cannot selectively input a plurality of identifiers. In this embodiment of this application, the M identifiers support to be multiple selected. Because the M identifiers support to be multiple selected, the user may select a plurality of identifiers from the M identifiers, thus checking a plurality of group members indicated by the plurality of identifiers.

Optionally, each of the M identifiers includes a profile photo of one group member and one check box.

Further, each of the M identifiers may further include at least one of the following: a name of the group member, a WeChat ID of the group member, and a quick response code of the group member.

In an optional implementation, if the first input is an input for a first profile photo, and the first profile photo is a profile photo of any group member in the communication interface, the M identifiers are displayed on the communication interface.

Figure 2:
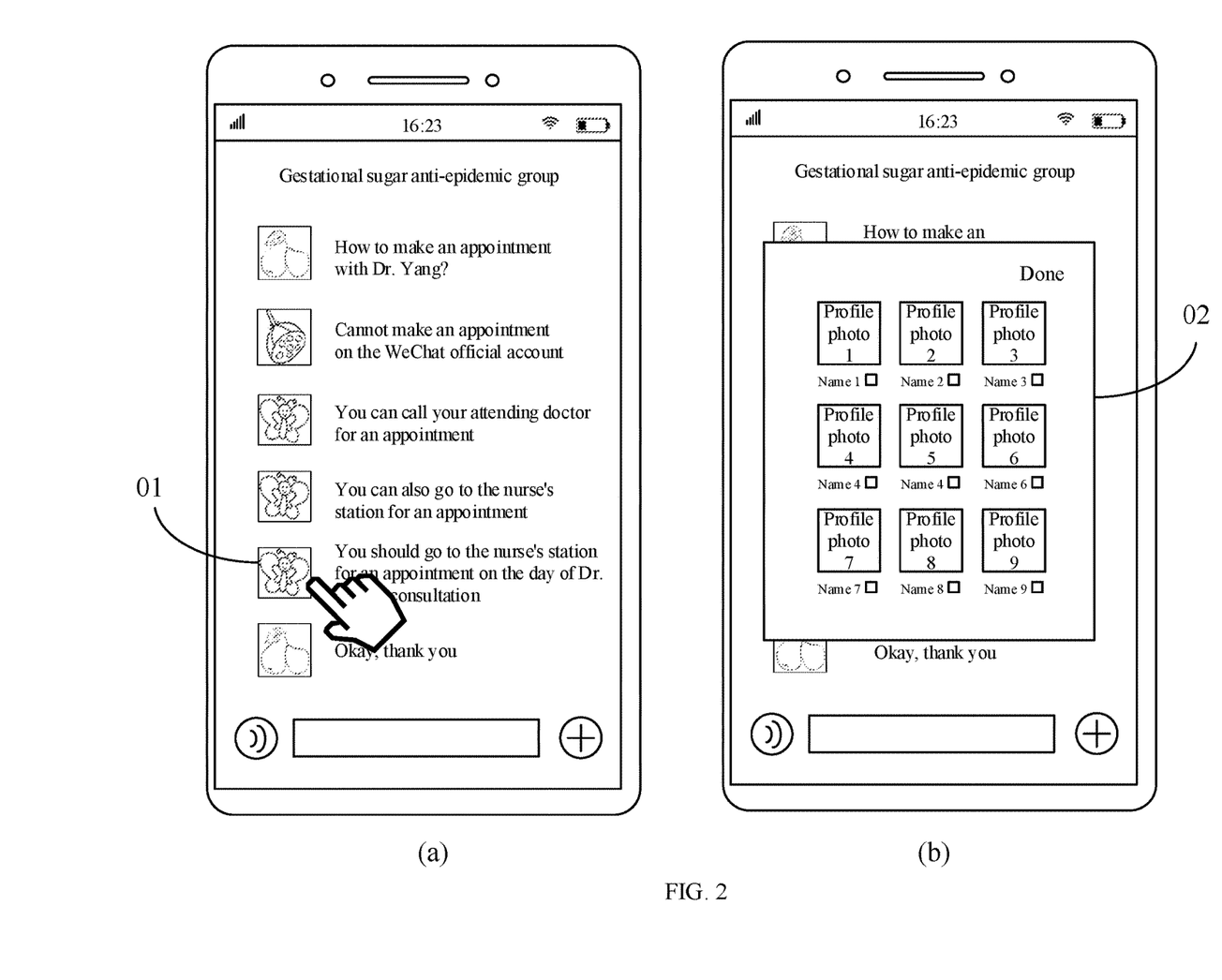
FIG. 2 is a first schematic diagram of an operation for triggering displaying a group member identifier according to an embodiment of this application.

For example, the communication interface of the target group as shown in (a) of FIG. 2 includes a plurality of communication messages, and each communication message is corresponding to a profile photo of one group member. The user may have a double tap on a profile photo 01 of a specific group member, or touch and hold the profile photo 01 of the specific group member twice, then the electronic device may activate a multi-selection mode and display a group member list 02 as shown in (b) of FIG. 2 on the communication interface in a superposed manner. The group member list 02 includes a plurality of identifiers, and each identifier includes a profile photo of one group member, a name of the group member, and a check box corresponding to the group member.

In another optional implementation, if the first input is an input of inputting a preset symbol in the input box, a group member list interface is displayed, and the group member list interface includes M identifiers. That is, the M identifiers belong to the group member list interface.

The communication interface and the group member list interface are different interfaces.

Figure 3:
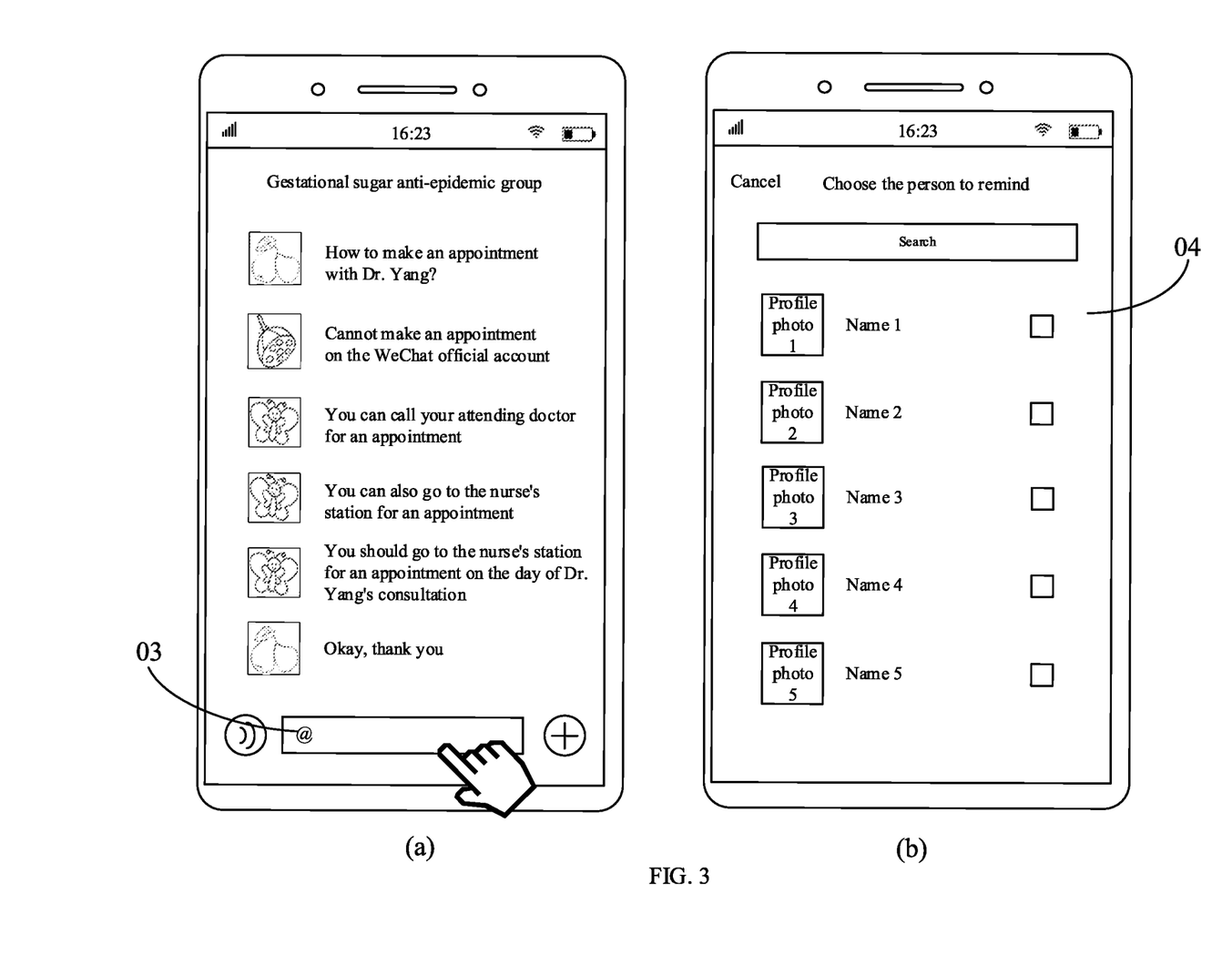
FIG. 3 is a second schematic diagram of an operation for triggering displaying a group member identifier according to an embodiment of this application.

For example, in a case of displaying the communication interface of the target group as shown in (a) of FIG. 3, the user may input a symbol of @ 03 in the communication interface, so that the electronic device may activate the multi-selection mode and update the communication interface to display a group member list interface 04 as shown in (b) of FIG. 3. The group member list interface 04 includes a plurality of identifiers, and each identifier includes a profile photo of one group member, a name of the group member, and a check box corresponding to the group member.

S103. The electronic device receives a second input for N identifiers among the M identifiers.

N is an integer greater than or equal to 2, and N is less than or equal to M.

It should be noted that the N identifiers may be used to indicate N group members in the target group, and the N identifiers may be some or all of the M identifiers.

S104. In response to the second input, the electronic device displays a preset symbol and N names in a preset combination form in an input box.

The N names are names of the N group members indicated by the N identifiers. The preset symbol and the N names in the preset combination form may be used to remind the N group members to view a message.

It should be noted that "the preset symbol and the N names in the preset combination form are used to remind the N group members to view a message" means that when the preset symbol and the names of the N group members exist in the input box in the preset combination form, if the user triggers the electronic device to send a communication message in the target group, electronic devices of the N group members may remind users of the communication message by ringing, vibrating, displaying prompt information, or the like, namely, remind the N group members to view the communication message, regardless of whether the N group members enable a message shielding function.

In a first possible implementation, after receiving a selective input for N identifiers among M identifiers from the user, if no other input from the user is received within preset duration, then after the preset duration, the electronic device will display the preset symbol and N names in the preset combination form in the input box.

In a second possible implementation, after receiving a selective input for N identifiers among M identifiers from the user, if an input for a first control is received, the electronic device will display the preset symbol and N names in the preset combination form in the input box, where the first control may be used to confirm that N identifiers are checked.

As for the second possible implementation, in a case that each of the M identifiers includes a profile photo of one group member and one check box, the second input includes N first sub-inputs and one second sub-input. S103 and S104 described above can be implemented through the following a1, a2, b1, and b2.

a1. The electronic device receives an $i^{th}$ first sub-input for an $i^{th}$ check box.

a2. The electronic device adds a check mark to the $i^{th}$ check box in response to the $i^{th}$ first sub-input. The check mark may be used to indicate that one group member corresponding to the $i^{th}$ check box is checked. Values of i are sequentially 1, 2, . . . , N.

b1. The terminal device receives a second sub-input for the first control.

b2. In response to the second sub-input, the electronic device displays a preset symbol and N names in a preset combination form in an input box.

Figure 4:
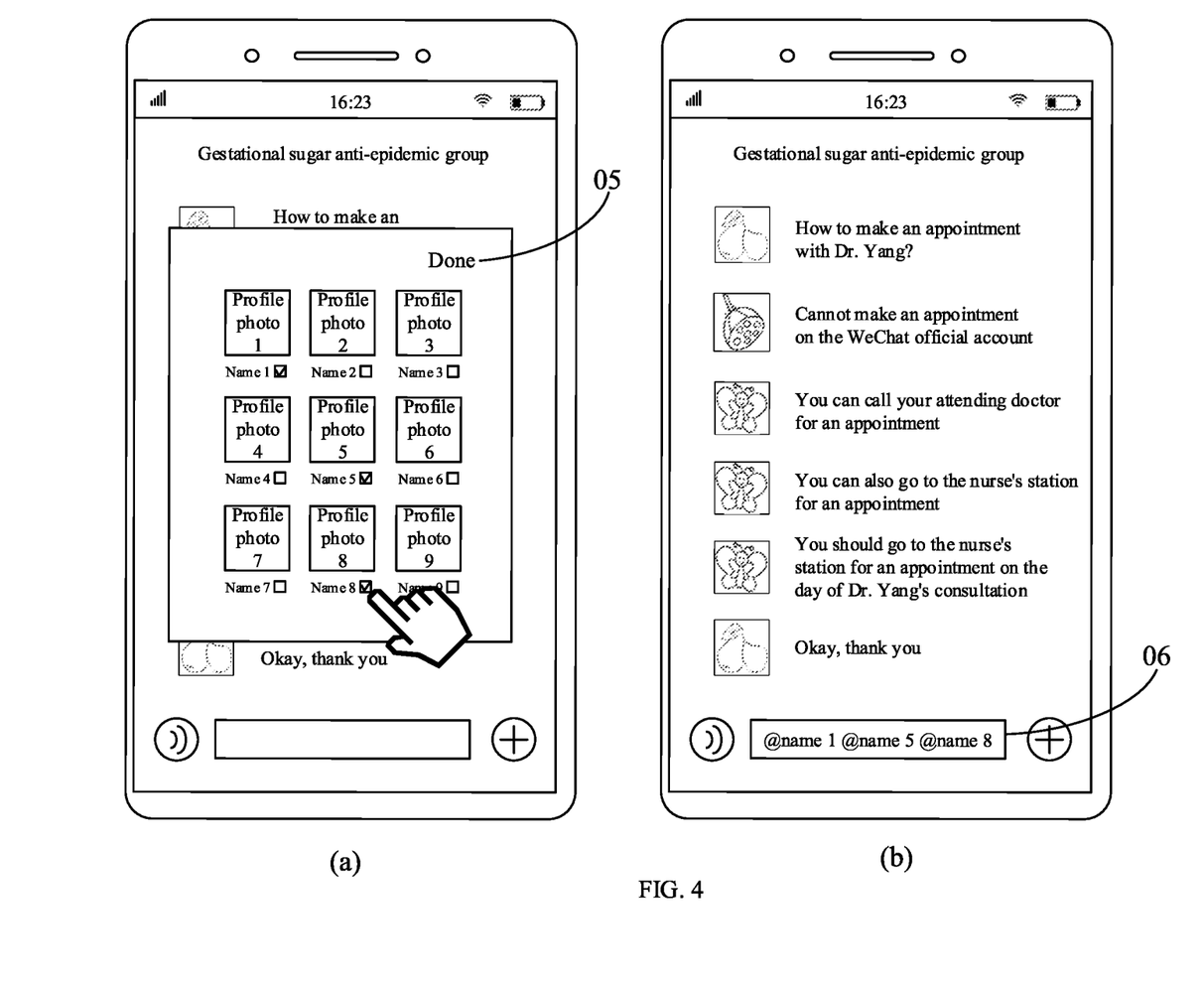
FIG. 4 is a schematic diagram of an operation for triggering displaying a preset symbol and a name of a group member in a preset combination form according to an embodiment of this application.

For example, if N=3, as shown in (a) of FIG. 4, the user may tap a check box corresponding to a profile photo 1 and a name 1, thus adding a check mark "√" to the check box; then the user may tap a check box corresponding to a profile photo 5 and a name 5, thus adding a check mark "√" to the check box; and then the user may tap a check box corresponding to a profile photo 8 and a name 8, thus adding a check mark "√" to the check box. After selecting these three check boxes, the user may tap a "done" control 05, so that the electronic device may display "@name 1 @name 5 @name 8" 06 in the input box in a preset combination form as shown in (b) of FIG. 4.

S105. The electronic device sends a communication message in the target group, where the communication message includes the preset symbol and the N names in the preset combination form.

In this embodiment of this application, the communication message may also be referred to as a chat message.

In an optional implementation, the communication message includes only the preset symbol and the N names in the preset combination form, and does not include other contents.

In another optional implementation, the communication message includes not only the preset symbol and the N names in the preset combination form, but also the target chat content. For example, the target chat content is a chat content manually inputted by the user in the input box.

It should be noted that the sending the communication message in the target group refers to that the electronic device sends the communication message to a device of each group member in the target group. These group members may include group members who enable the group message blocking function and group members who do not enable the group message blocking function.

For example, after displaying the preset symbol and the N names in the preset combination form in the input box, the sending method provided in this embodiment of this application may further include: receiving a first message content inputted by the user in a message input and an input for a sending control; and in response to the input, sending a target message (namely, a communication message) to each group member in the target group, where the target message may include not only the preset symbol and the N names in the preset combination form, but also the first message content. Correspondingly, after each group member in the target group receives the target message, there are the following possible cases.

In a case, if the group member who receives the target message is a group member among the N group members, regardless of whether the group member enables the group message blocking function of the device, the device of the group member will remind the group member to view the target message in a target manner.

In another case, if the group member who receives the target message is a group member other than the N group members, and the group member enables the group message blocking function of the device, the device of the group member will not remind the group member to view the target message in a target manner.

In still another case, if the group member who receives the target message is a group member other than the N group members, but the group member does not enable the group message blocking function of the device, the device of the group member will remind the group member to view the target message in a target manner.

Further, in the foregoing three cases, the target manner may include at least one of displaying a notification message in a notification bar, outputting a preset sound, flashing a flash in a preset mode, displaying a preset identifier on a profile photo of the target group, and displaying a preset identifier on an icon of an application corresponding to the target group.

In this embodiment of this application, because the M identifiers used to indicate the M group members in the target group support to be multiple selected, the user may check the N identifiers by inputting the N identifiers among the M identifiers. As a result, the preset symbol and the names of the N group members indicated by the N identifiers can be displayed in the input box in the preset combination form without the need for the user to repeat the operation of finding a profile photo of each group member and touching and holding the profile photo of the group member. In this way, by sending a communication message including the preset symbol and the names of the N group members in the preset combination form to the target group, a message reminding operation for a plurality of group members in the target group is simplified, and quick message reminding for a plurality of group members is realized.

Figure 5:
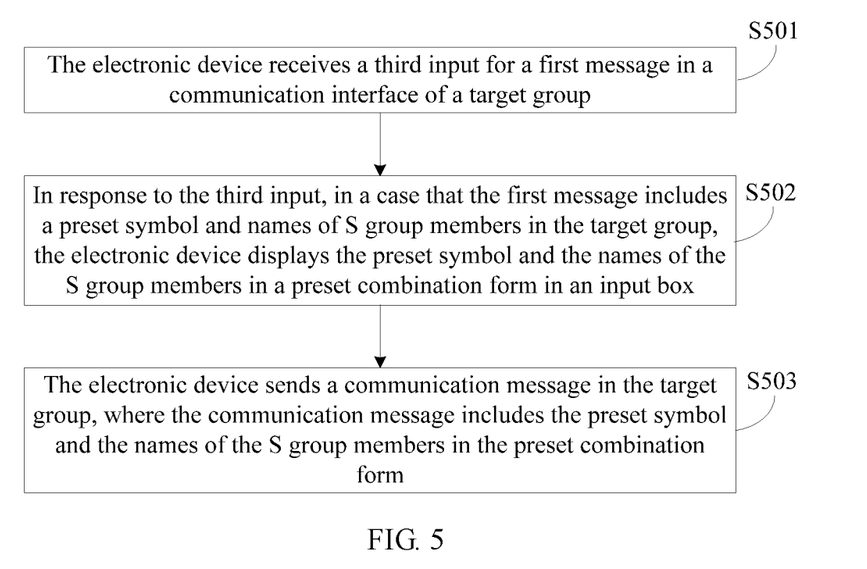
FIG. 5 is a schematic diagram of another sending method according to an embodiment of this application.

In order to solve the problem of cumbersome operation in the foregoing third scenario, the following describes in detail the sending method provided in the embodiments of this application through specific embodiments and application scenarios thereof with reference to FIG. 5.

As shown in FIG. 5, an embodiment of this application provides a sending method. The method may include the following S501 to S503.

The method is described below by using an example in which the electronic device is used as an execution entity.

S501. The electronic device receives a third input for a first message in a communication interface of a target group.

The communication interface of the target group may include communication messages of a plurality of group members. The first message may be any one of the communication messages that are sent by the plurality of group members and that are selected by the user other than a message sent by a user (a group member) using the electronic device.

Optionally, the third input may include a copy input for the first message in the communication interface and a paste input for the first message in the input box.

S502. In response to the third input, in a case that the first message includes a preset symbol and names of S group members in the target group, the electronic device displays the preset symbol and the names of the S group members in a preset combination form in an input box.

"The preset symbol and the names of the S group members in a preset combination form" is used to remind the S group members to view the communication message. S is an integer greater than or equal to 2.

As for the description of "the preset symbol and the names of the S group members in a preset combination form", reference may be made to the related description of "the preset symbol and the N names in the preset combination form" in Embodiment 1, details are not described herein again.

For example, after receiving the third input for the first message in the communication interface of the target group, the electronic device may parse the content of the first message to obtain a first character string. Then the electronic device may detect whether the first character string includes a preset symbol of @. If the first character string includes the preset symbol of @, then the electronic device may further detect whether the first character string includes a name of a group member in the target group. In a case that the first character string includes the preset symbol of @ and the names of the S group members in the target group, the electronic device may rewrite the preset symbol of @ and the names of the S group members in the first character string into those in the preset combination form, thus obtaining the preset symbol and the names of the S group members in the preset combination form. In a case that the first character string does not include the preset symbol of @ and/or the names of the S group members, the electronic device does not need to rewrite any symbol in the first character string into that in the preset combination form.

S503. The electronic device sends a communication message in the target group, where the communication message includes the preset symbol and the names of the S group members in the preset combination form.

In an optional implementation, the communication message includes only the preset symbol and the names of the S group members in the preset combination form, and does not include other contents.

In another optional implementation, the communication message includes not only the preset symbol and the names of the S group members in the preset combination form, but also the target chat content. The target chat content is the same as a chat content in the first message; or the target chat content is different from the chat content in the first message. For example, the target chat content is a chat content manually inputted by the user in the input box.

In this embodiment of this application, if the first message copied by the user in the communication interface of the target group includes a preset symbol and names of a plurality of group members, the preset symbol and the names of the S group members indicated by the S identifiers can be displayed in the input box in the preset combination form without the need for the user to repeat the operation of finding a profile photo of each group member and touching and holding the profile photo of the group member. In this way, by sending a communication message including the preset symbol and the names of the S group members in the preset combination form to the target group, a message reminding operation for a plurality of group members in the target group is simplified, and quick message reminding for a plurality of group members is realized.

Optionally, in a case that the first message includes not only the preset symbol and the names of the S group members in the target group, but also the target chat content, after S501 but before S503, the sending method provided in this embodiment of this application may also include S504 as follows; and correspondingly, S503 can be implemented through the following S503a and S503b.

S504. In response to the third input, in a case that the first message further includes a target chat content, the electronic device displays the target chat content in the input box.

This embodiment of this application does not specify an execution sequence of "displaying the preset symbol and the names of the S group members in a preset combination form in an input box" in S502 and "displaying the target chat content in the input box" in S504, which can be determined according to the actual use requirements. For example, the electronic device may simultaneously display the preset symbol and the names of the S group members in the preset combination form, and the target chat content in the input box; or the electronic device may first display the preset symbol and the names of the S group members in the preset combination form in the input box, and then display the target chat content in the input box.

It should be noted that the target chat content can be any chat content in the first message other than the preset symbol and the names of the S group members. For example, if the first message is "@name 1 @name 2 will be in the conference room at 9:00 on Friday", the preset symbol is @ the names of the S group members are the name 1 and the name 2, and the target chat content can be "will be in the conference room at 9:00 on Friday".

S503a. The electronic device receives a fourth input for a target control.

The target control is used to confirm to send all contents in the input box. For example, the target control may be a sending control in the communication interface.

S503b. In response to the fourth input, the electronic device sends a communication message in the target group, where the communication message includes the target chat content, and the preset symbol and the names of the S group members in the preset combination form.

As for the description of "sending the second message in the target group", reference may be made to the description of "sending a target message to each group member in the target group" in Embodiment 1, details are not described herein again.

In this embodiment of this application, in a case that the first message includes not only the preset symbol and the names of the S group members in the target group, but also the target chat content, since the electronic device may display the preset symbol and the names of the S group members in the preset combination form and the target chat content in the input box, the user does not need to manually input every character in the target chat content, thus simplifying the user operation.

It should be noted that the sending method provided in this embodiment of this application may be performed by a sending apparatus or a control module that is in the sending apparatus and that is configured to perform the sending method. In this embodiment of this application, the sending apparatus provided in this embodiment of this application is described by using an example in which the sending apparatus performs the sending method.

Figure 6:
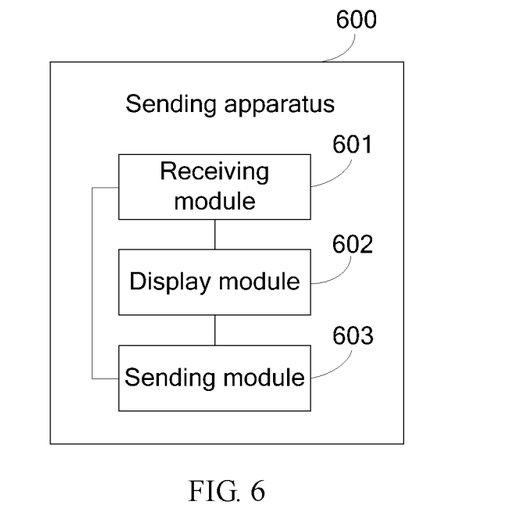
FIG. 6 is a first schematic structural diagram of a sending apparatus according to an embodiment of this application.

As shown in FIG. 6, an embodiment of this application provides a sending apparatus 600. The sending apparatus includes a receiving module 601, a display module 602, and a sending module 603.

The receiving module 601 may be configured to receive a first input for a communication interface of a target group. The display module 602 may be configured to: in response to the first input received by the receiving module 601, display M identifiers, where each of the M identifiers may be used to indicate one group member in the target group, and the M identifiers support to be multiple selected. The receiving module 601 may further be configured to receive a second input for N identifiers among the M identifiers displayed by the display module 602. The display module 602 may further be configured to: in response to the second input received by the receiving module 601, display a preset symbol and N names in a preset combination form in an input box, where the N names are names of N group members indicated by the N identifiers. The sending module 603 may be configured to send a communication message in the target group, where the communication message includes the preset symbol and the N names in the preset combination form. The preset symbol and the N names in the preset combination form may be used to remind the N group members to view the communication message, and both M and N are integers greater than or equal to 2.

Optionally, each of the M identifiers may include a profile photo of one group member and one check box; and the second input may include N first sub-inputs and one second sub-input. The display module 602 may be configured to: in response to an $i^{th}$ first sub-input for an $i^{th}$ check box, add a check mark to the $i^{th}$ check box, where the check mark is used to indicate that one group member corresponding to the $i^{th}$ check box is checked; and in response to the second sub-input, display a preset symbol and N names in a preset combination form in an input box.

Optionally, if the first input is an input for a first profile photo, and the first profile photo is a profile photo of any group member in the communication interface, the M identifiers are displayed on the communication interface; or if the first input is an input of inputting the preset symbol in the input box, the M identifiers are displayed on a group member list interface, where the communication interface and the group member list interface are different interfaces.

According to the sending apparatus provided in this embodiment of this application, because the M identifiers used to indicate the M group members in the target group support to be multiple selected, the user may check the N identifiers by inputting the N identifiers among the M identifiers. As a result, the preset symbol and the names of the N group members indicated by the N identifiers can be displayed in the input box in the preset combination form without the need for the user to repeat the operation of finding a profile photo of each group member and touching and holding the profile photo of the group member. In this way, by sending a communication message including the preset symbol and the names of the N group members in the preset combination form to the target group, a message reminding operation for a plurality of group members in the target group is simplified, and quick message reminding for a plurality of group members is realized.

Figure 7:
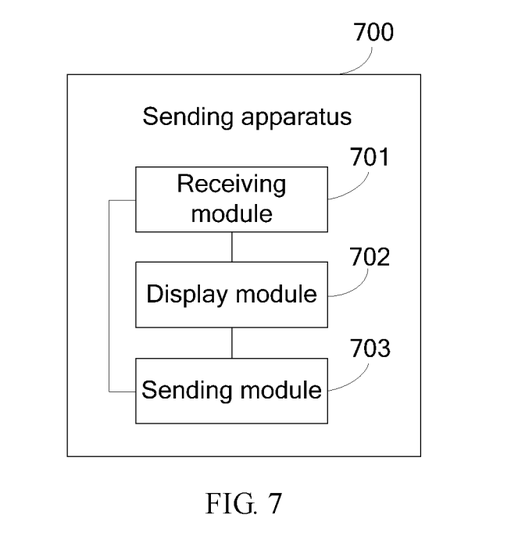
FIG. 7 is a second schematic structural diagram of a sending apparatus according to an embodiment of this application.

As shown in FIG. 7, an embodiment of this application provides a sending apparatus 700. The sending apparatus includes a receiving module 701, a display module 702, and a sending module 703.

The receiving module 701 may be configured to receive a third input for a first message in a communication interface of a target group. The display module 702 may be configured to: in response to the third input received by the receiving module 701, in a case that the first message includes a preset symbol and names of S group members in the target group, display the preset symbol and the names of the S group members in a preset combination form in an input box. The sending module 703 may be configured to send a communication message in the target group, where the communication message includes the preset symbol and the names of the S group members in the preset combination form. The preset symbol and the names of the S group members in the preset combination form may be used to remind the S group members to view the communication message, and S is an integer greater than or equal to 2.

Optionally, the display module 702 may further be configured to: in response to the third input received by the receiving module 701, in a case that the first message further includes a target chat content, display the target chat content in the input box. The receiving module 701 may further be configured to receive a fourth input for a target control. The sending module 703 may be configured to: in response to the fourth input received by the receiving module 701, send a communication message in the target group, where the communication message may include the target chat content, and the preset symbol and the names of the S group members in the preset combination form.

According to the sending apparatus provided in this embodiment of this application, if the first message copied by the user in the communication interface of the target group includes a preset symbol and names of a plurality of group members, the apparatus may display the preset symbol and the names of the S group members in the input box in the preset combination form without the need for the user to repeat the operation of finding a profile photo of each group member and touching and holding the profile photo of the group member. In this way, by sending a communication message including the preset symbol and the names of the S group members in the preset combination form to the target group, a message reminding operation for a plurality of group members in the target group is simplified, and quick message reminding for a plurality of group members is realized.

The sending apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The sending apparatus in this embodiment of this application may be an apparatus with an operating system. The operating system may be an Android operating system, an iOS operating system, or another possible operating system. This is not specifically limited in this embodiment of this application.

The sending apparatus as shown in FIG. 6 provided in this embodiment of this application can implement processes implemented in the method embodiment from FIG. 1 to FIG. 4, and the sending apparatus as shown in FIG. 7 provided in this embodiment of this application can implement processes implemented in the method embodiment of FIG. 5. To avoid repetition, details are not described herein again.

Figure 8:
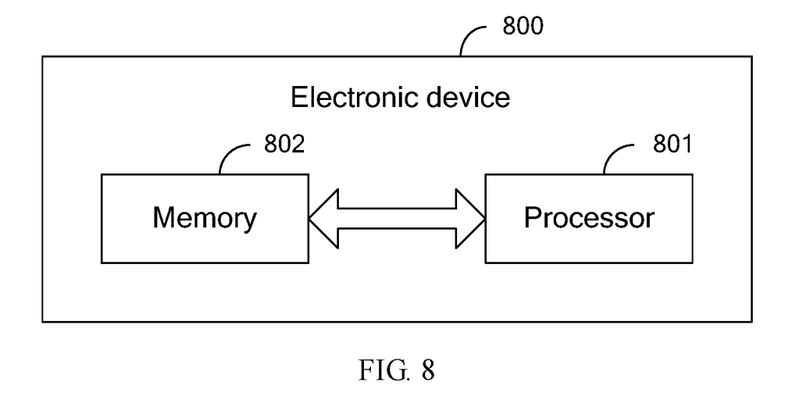
FIG. 8 is a first schematic diagram of hardware of an electronic device according to an embodiment of this application.

Optionally, as shown in FIG. 8, an embodiment of this application further provides an electronic device 800, including a processor 801, a memory 802, and a program or an instruction stored in the memory 802 and executable on the processor 801. When the program or the instruction is executed by the processor 801, the processes of the foregoing sending method embodiments are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 9:
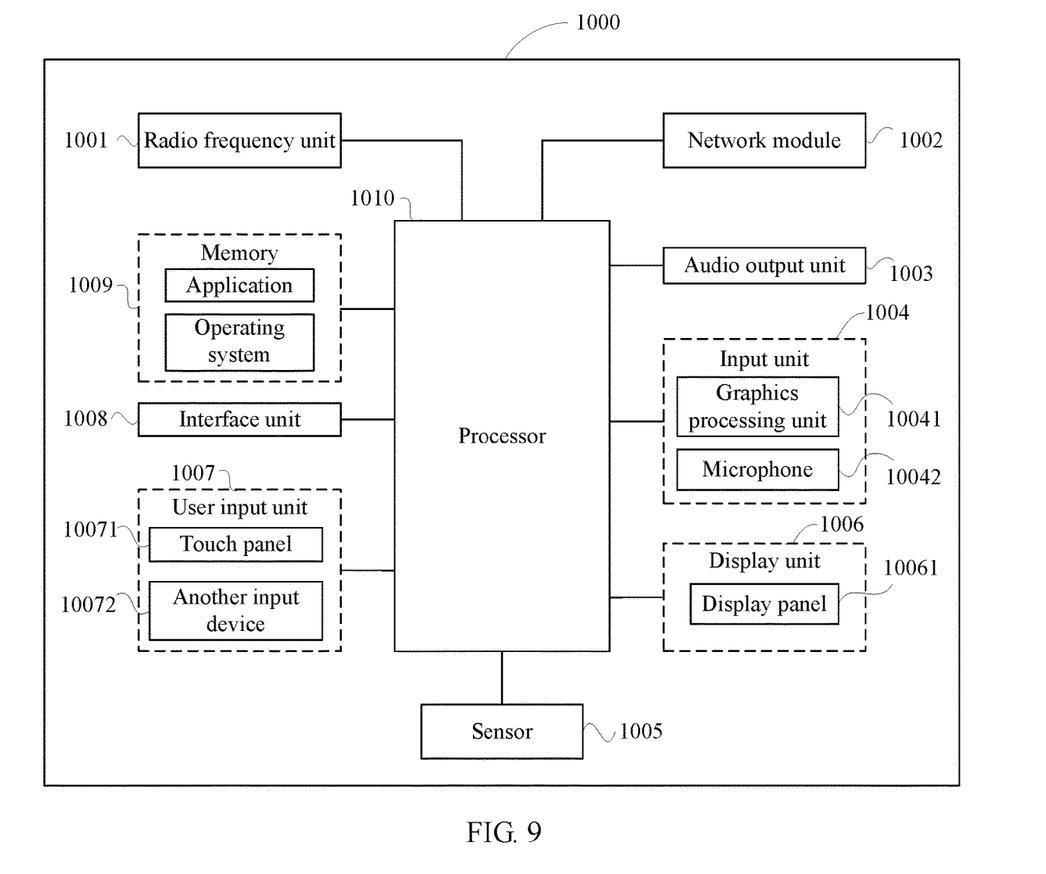
FIG. 9 is a second schematic diagram of hardware of an electronic device according to an embodiment of this application.

FIG. 9 is a schematic structural diagram of hardware of an electronic device according to an embodiment of this application.

The electronic device 1000 includes, but is not limited to: a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 9 does not constitute a limitation on the electronic device. The electronic device may include components more or fewer components than those shown in the diagram, a combination of some components, or different component arrangements. Details are not described herein.

First Implementation

The user input unit 1007 may be configured to receive a first input for a communication interface of a target group. The display unit 1006 may be configured to: in response to the first input received by the user input unit 1007, display M identifiers, where each of the M identifiers may be used to indicate one group member in the target group, and the M identifiers support to be multiple selected. The user input unit 1007 may further be configured to receive a second input for N identifiers among the M identifiers displayed by the display unit 1006. The display unit 1006 may further be configured to: in response to the second input received by the user input unit 1007, display a preset symbol and N names in a preset combination form in an input box, where the N names are names of N group members indicated by the N identifiers. The radio frequency unit 1001 may be configured to send a communication message in the target group, where the communication message includes the preset symbol and the N names in the preset combination form. The preset symbol and the N names in the preset combination form may be used to remind the N group members to view the communication message, and both M and N are integers greater than or equal to 2.

Optionally, each of the M identifiers may include a profile photo of one group member and one check box; and the second input may include N first sub-inputs and one second sub-input. The display unit 1006 may be configured to: in response to an $i^{th}$ first sub-input for an $i^{th}$ check box, add a check mark to the $i^{th}$ check box, where the check mark may be used to indicate that one group member corresponding to the $i^{th}$ check box is checked; and in response to the second sub-input, display a preset symbol and N names in a preset combination form in the input box.

Optionally, if the first input is an input for a first profile photo, and the first profile photo is a profile photo of any group member in the communication interface, the M identifiers are displayed on the communication interface; or if the first input is an input of inputting the preset symbol in the input box, the M identifiers are displayed on a group member list interface. The communication interface and the group member list interface are different interfaces.

According to the electronic device provided in this embodiment of this application, because the M identifiers used to indicate the M group members in the target group support to be multiple selected, the user may check the N identifiers by inputting the N identifiers among the M identifiers. As a result, the preset symbol and the names of the N group members indicated by the N identifiers can be displayed in the input box in the preset combination form without the need for the user to repeat the operation of finding a profile photo of each group member and touching and holding the profile photo of the group member. In this way, by sending a communication message including the preset symbol and the names of the N group members in the preset combination form to the target group, a message reminding operation for a plurality of group members in the target group is simplified, and quick message reminding for a plurality of group members is realized.

Second Implementation

The user input unit 1007 may be configured to receive a third input for a first message in a communication interface of a target group. The display unit 1006 may be configured to: in response to the third input received by the user input unit 1007, in a case that the first message includes a preset symbol and names of S group members in the target group, display the preset symbol and the names of the S group members in a preset combination form in an input box. The radio frequency unit 1001 may be configured to send a communication message in the target group, where the communication message includes the preset symbol and the names of the S group members in the preset combination form. The preset symbol and the names of the S group members in the preset combination form may be used to remind the S group members to view the communication message, and S is an integer greater than or equal to 2.

Optionally, the display unit 1006 may further be configured to: in response to the third input received by the user input unit 1007, in a case that the first message further includes a target chat content, display the target chat content in the input box. The user input unit 1007 may further be configured to receive a fourth input for a target control. The radio frequency unit 1001 may be configured to: in response to the fourth input received by the user input unit 1007, send a communication message in the target group, where the communication message may include the target chat content, and the preset symbol and the names of the S group members in the preset combination form.

According to the electronic device provided in this embodiment of this application, if the first message copied by the user in the communication interface of the target group includes a preset symbol and names of a plurality of group members, the electronic device may display the preset symbol and the names of the S group members in the input box in the preset combination form without the need for the user to repeat the operation of finding a profile photo of each group member and touching and holding the profile photo of the group member. In this way, by sending a communication message including the preset symbol and the names of the S group members in the preset combination form to the target group, a message reminding operation for a plurality of group members in the target group is simplified, and quick message reminding for a plurality of group members is realized.

It should be understood that, in this embodiment of this application, the input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061. The display panel 10061 may be configured in a form such as a liquid crystal display or an organic light-emitting diode. The user input unit 1007 includes a touch panel 10071 and another input device 10072, and the touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various pieces of data, including but not limited to an application and an operating system. An application processor and a modem processor may be integrated into the processor 1010. The application processor mainly processes an operating system, a user interface, an application, and the like. The modem processor mainly processes wireless communication. It can be understood that, alternatively, the modem processor may not be integrated into the processor 1010.

An embodiment of this application further provides a readable storage medium. The readable storage medium stores a program or an instruction, and when the program or the instruction is executed by a processor, the processes of the foregoing sending method embodiment are implemented and a same technical effect can be achieved. To avoid repetition, details are not described herein again.

The processor is the processor in the electronic device described in the above embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing sending method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "comprise", or any other variant is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

What is claimed is:

1. A sending method performed by an electronic device, wherein the sending method comprises:
   receiving a first input performed on a communication interface of a target group;
   displaying M identifiers in response to the first input, wherein each identifier is used to indicate one group member in the target group, and the M identifiers support to be multiple selected;
   receiving a second input performed on N identifiers among the M identifiers;
   displaying a preset symbol and N names in a preset combination form in an input box in response to the second input, wherein the N names are names of N group members indicated by the N identifiers; and
   sending a communication message in the target group, wherein the communication message comprises the preset symbol and the N names in the preset combination form, wherein
   the preset symbol and the N names in the preset combination form are used to remind the N group members to view the communication message, and both M and N are integers greater than or equal to 2.

2. The sending method according to claim 1, wherein each of the M identifiers comprises a profile photo of one group member and one check box; and the second input comprises N first sub-inputs and one second sub-input; and the displaying a preset symbol and N names in a preset combination form in an input box in response to the second input comprises:
adding, a check mark to the ith check box in response to an ith first sub-input performed on an ith check box, wherein the check mark is used to indicate that one group member corresponding to the ith check box is checked; and
displaying a preset symbol and N names in a preset combination form in an input box in response to the second sub-input.

3. The sending method according to claim 1, wherein in a case that the first input is an input performed on a first profile photo, and the first profile photo is a profile photo of any group member in the communication interface, the M identifiers are displayed on the communication interface; or
in a case that the first input is an input of inputting the preset symbol in the input box, the M identifiers are displayed on a group member list interface, wherein the communication interface and the group member list interface are different interfaces.

4. The sending method according to claim 2, wherein in a case that the first input is an input performed on a first profile photo, and the first profile photo is a profile photo of any group member in the communication interface, the M identifiers are displayed on the communication interface; or
in a case that the first input is an input of inputting the preset symbol in the input box, the M identifiers are displayed on a group member list interface, wherein the communication interface and the group member list interface are different interfaces.

5. A sending method performed by an electronic device, wherein the sending method comprises:
receiving a third input performed on a first message in a communication interface of a target group;
displaying, in a case that the first message comprises a preset symbol and names of S group members in the target group, the preset symbol and the names of the S group members in a preset combination form in an input box in response to the third input; and
sending a communication message in the target group, wherein the communication message comprises the preset symbol and the names of the S group members in the preset combination form, wherein
the preset symbol and the names of the S group members in the preset combination form are used to remind the S group members to view the communication message, and S is an integer greater than or equal to 2.

6. The sending method according to claim 5, wherein before the sending a communication message in the target group, the sending method further comprises:
displaying, in a case that the first message further comprises a target chat content, the target chat content in the input box in response to the third input; and
the sending a communication message in the target group comprises:
receiving a fourth input performed on a target control; and
sending a communication message in the target group in response to the fourth input, wherein the communication message comprises the target chat content, and the preset symbol and the names of the S group members in the preset combination form.

7. An electronic device, comprising a processor, a memory, and a program or an instruction stored in the memory and executable on the processor, wherein when the program or the instruction is executed by the processor, following steps are implemented:
receiving a first input performed on a communication interface of a target group;
displaying M identifiers in response to the first input, wherein each identifier is used to indicate one group member in the target group, and the M identifiers support to be multiple selected;
receiving a second input performed on N identifiers among the M identifiers;
displaying a preset symbol and N names in a preset combination form in an input box in response to the second input, wherein the N names are names of N group members indicated by the N identifiers; and
sending a communication message in the target group, wherein the communication message comprises the preset symbol and the N names in the preset combination form, wherein
the preset symbol and the N names in the preset combination form are used to remind the N group members to view the communication message, and both M and N are integers greater than or equal to 2.

8. The electronic device according to claim 7, wherein each of the M identifiers comprises a profile photo of one group member and one check box; and the second input comprises N first sub-inputs and one second sub-input; and
the displaying a preset symbol and N names in a preset combination form in an input box in response to the second input comprises:
adding, a check mark to the ith check box in response to an ith first sub-input performed on an ith check box, wherein the check mark is used to indicate that one group member corresponding to the ith check box is checked; and
displaying a preset symbol and N names in a preset combination form in an input box in response to the second sub-input.

9. The electronic device according to claim 7, wherein in a case that the first input is an input performed on a first profile photo, and the first profile photo is a profile photo of any group member in the communication interface, the M identifiers are displayed on the communication interface; or
in a case that the first input is an input of inputting the preset symbol in the input box, the M identifiers are displayed on a group member list interface, wherein the communication interface and the group member list interface are different interfaces.

10. The electronic device according to claim 8, wherein in a case that the first input is an input performed on a first profile photo, and the first profile photo is a profile photo of any group member in the communication interface, the M identifiers are displayed on the communication interface; or
in a case that the first input is an input of inputting the preset symbol in the input box, the M identifiers are displayed on a group member list interface, wherein the communication interface and the group member list interface are different interfaces.

* * * * *